(12) United States Patent
Lucas (10) Patent No.: US 10,330,065 B2
(45) Date of Patent: Jun. 25, 2019

(54) DIRECT MAGNETICALLY CONTROLLED INLET VALVE FOR FUEL PUMP

(71) Applicant: Stanadyne LLC, Windsor, CT (US)

(72) Inventor: Robert G. Lucas, Ellington, CT (US)

(73) Assignee: Stanadyne LLC, Windsor, CT (US)

( * ) Notice: Subject to any disclaimer, the term of this patent is extended or adjusted under 35 U.S.C. 154(b) by 464 days.

(21) Appl. No.: 15/062,774

(22) Filed: Mar. 7, 2016

(65) Prior Publication Data

US 2017/0254305 A1   Sep. 7, 2017

(51) Int. Cl.
| F04B 7/00 | (2006.01) |
| F02M 59/36 | (2006.01) |
| F02M 59/46 | (2006.01) |
| F04B 49/22 | (2006.01) |
| F04B 53/10 | (2006.01) |
| F16K 27/02 | (2006.01) |
| F16K 31/06 | (2006.01) |

(52) U.S. Cl.
CPC ........ *F02M 59/368* (2013.01); *F02M 59/367* (2013.01); *F02M 59/466* (2013.01); *F04B 7/0076* (2013.01); *F04B 49/22* (2013.01); *F04B 53/10* (2013.01); *F04B 53/1082* (2013.01); *F16K 27/029* (2013.01); *F16K 31/0648* (2013.01); *F16K 31/0675* (2013.01); *F02M 2200/08* (2013.01)

(58) Field of Classification Search
CPC .. F02M 59/368; F02M 59/367; F02M 59/466; F02M 2200/08; F04B 7/0076; F04B 49/22; F04B 53/10; F04B 53/1082; F16K 27/029; F16K 31/0648; F16K 31/0675
USPC ............. 251/129.15, 129.16, 129.02, 129.21
See application file for complete search history.

(56) References Cited

U.S. PATENT DOCUMENTS

| 3,001,757 | A | * | 9/1961 | Ball | F01L 25/08 |
| | | | | | 251/129.16 |
| 4,883,252 | A | * | 11/1989 | Mesenich | F02D 41/40 |
| | | | | | 123/472 |
| 5,447,288 | A | * | 9/1995 | Keuerleber | H01F 7/1638 |
| | | | | | 251/129.16 |
| 5,476,079 | A | * | 12/1995 | Kanamori | F02M 51/005 |
| | | | | | 123/458 |
| 5,606,953 | A | * | 3/1997 | Drummer | F02M 57/02 |
| | | | | | 123/458 |
| 6,116,870 | A | * | 9/2000 | Kraemer | F02M 59/464 |
| | | | | | 417/490 |
| 6,526,947 | B2 | | 3/2003 | Shimada et al. | |
| 6,604,726 | B2 | * | 8/2003 | Kumar | F16K 31/0655 |
| | | | | | 251/129.16 |

(Continued)

*Primary Examiner* — Alexander B Comley
*Assistant Examiner* — Benjamin Doyle
(74) *Attorney, Agent, or Firm* — Alix, Yale & Ristas, LLP (57) ABSTRACT

An inlet valve assembly for a fuel pump comprises a valve assembly inflow path and valve assembly outflow path; a magnetic valve member situated in an intermediate flow path fluidly linking the inflow path and the outflow path; a magnetic pole adjacent the valve member; and a selectively energizable coil for generating a magnetic flux directly magnetically coupling the pole and the valve member; whereby the valve member opens and closes fluid communication between the inflow path and the outflow path in response to the energized state of the coil.

19 Claims, 5 Drawing Sheets

(56) References Cited

U.S. PATENT DOCUMENTS

| | | | |
|---|---|---|---|
| 6,793,196 B2* | 9/2004 | VanWeelden | F02M 59/366 251/129.07 |
| 6,807,943 B2* | 10/2004 | VanWeelden | F02M 59/366 123/458 |
| 6,974,117 B2* | 12/2005 | Dzialakiewicz | F16K 31/0655 251/129.08 |
| 7,513,240 B2 | 4/2009 | Usui et al. | |
| 7,540,274 B2* | 6/2009 | Yamada | F02M 59/442 123/496 |
| 7,568,469 B2* | 8/2009 | Tokuo | F02D 41/3845 123/446 |
| 7,604,462 B2* | 10/2009 | Inoue | F04B 1/0408 417/53 |
| 7,721,416 B2* | 5/2010 | Rodriguez-Amaya | F02M 57/023 239/585.3 |
| 7,819,637 B2* | 10/2010 | Oda | F02M 59/366 251/129.07 |
| 8,421,568 B2* | 4/2013 | Deland | H01F 7/16 335/279 |
| 8,430,378 B2* | 4/2013 | Hutchings | F16K 31/0672 137/859 |
| 9,704,636 B2* | 7/2017 | Nagel | H01F 7/1638 |
| 2001/0031207 A1* | 10/2001 | Maeda | F02M 63/0225 417/298 |
| 2001/0048091 A1* | 12/2001 | Enomoto | F02M 59/466 251/129.15 |
| 2002/0117154 A1* | 8/2002 | Inoue | F02M 37/0041 123/506 |
| 2003/0089872 A1* | 5/2003 | Furuta | F02M 59/34 251/129.14 |
| 2004/0021111 A1* | 2/2004 | VanWeelden | F02M 59/366 251/129.15 |
| 2006/0222518 A1* | 10/2006 | Oda | F02M 59/366 417/298 |
| 2010/0111734 A1* | 5/2010 | Usui | F02M 59/366 417/505 |
| 2011/0126804 A1* | 6/2011 | Lucas | F02M 59/366 123/456 |
| 2014/0010687 A1* | 1/2014 | Oikawa | F04B 1/0452 417/437 |
| 2016/0281693 A1* | 9/2016 | Aritomi | F02M 59/368 |
| 2017/0248110 A1* | 8/2017 | Hashida | F02M 59/366 |
| 2017/0254305 A1* | 9/2017 | Lucas | F02M 59/368 |

* cited by examiner

DIRECT MAGNETICALLY CONTROLLED INLET VALVE FOR FUEL PUMP

BACKGROUND

The present invention relates to high pressure fuel pumps, and particularly to the inlet valve for feeding low pressure fuel to the high pressure pumping chamber.

Single piston and multi-piston high pressure common rail fuel pumps have been implemented to provide the high fuel pressures required by modern direct injected gasoline and diesel engines. These engine mounted pumps are volume controlled to minimize parasitic losses while maintaining rail pressure. Volume control is achieved either by inlet throttling using a magnetic proportional control valve, or indirect digital control of the inlet valve by a magnetic actuator. Either execution requires that the pump be controlled by an electrical signal from the engine ECU.

Because the indirect inlet valve actuator control requires a separate actuator for each pump piston, it has become common for multi-piston pumps to use a single inlet throttling proportional valve, in order to avoid a high part count and cost. Many modern single piston pumps use an indirect inlet valve actuator with a separate magnetically controlled armature assembly. These devices typically employ three separate components: inlet valve, magnetic armature, and the intervening engaging or connecting member. Different variants of this concept can be seen in U.S. Pat. Nos. 6,526,947, 7,513,240, 6,116,870, and 7,819,637. Due to the high complexity and precision of these devices, they typically account for at least ⅓ of the cost of a single piston pump. These digital type devices also suffer from high reciprocating mass and noise due to impact of the armature and valve assemblies during energizing and de-energizing events.

SUMMARY

The primary purpose of the present invention is to reduce the cost and noise of a magnetically controlled inlet valve actuator for fuel pumps.

The improved inlet valve assembly and associated pump, direct a magnetic flux path such that a magnetic force is directly applied to the inlet valve member when a coil is energized. As a result, direct actuation of the inlet valve is achieved, thereby eliminating the separate armature and armature to inlet valve connecting member, and reducing cost. By eliminating the separate armature and connecting member, reciprocating masses are reduced. Mass reduction minimizes impact generated noise and reduces response time for better controllability and lower power consumption.

The disclosed embodiment of an fuel inlet valve assembly comprises a valve assembly inflow path and valve assembly outflow path; a magnetic valve member situated in an intermediate flow path fluidly linking the inflow path and the outflow path; a magnetic pole adjacent the valve member; and a selectively energizable coil for generating a magnetic flux directly magnetically coupling the pole and the valve member; whereby the valve member opens and closes fluid communication between the inflow path and the outflow path in response to the energized state of the coil.

The disclosed fuel pump embodiment comprises a pump housing; a fuel inlet connection on the housing for delivering feed fuel into an inlet flow path in the housing; a pumping chamber and associated pumping mechanism in the housing for receiving feed fuel from inlet flow path through an inlet valve assembly, increasing the fuel pressure, and delivering pumped fuel to a discharge flow path; an outlet connection on the housing, in fluid communication with the discharge flow path through an outlet valve; wherein the inlet valve assembly includes a valve member directly magnetically coupled to a coil, whereby the coil is selectively energized to generate a magnetic flux path directly through the inlet valve member, thereby applying a magnetic force to the valve member to selectively open and close the valve member against a sealing surface in the inlet flow path.

Preferably, the inlet valve assembly includes a central magnetic pole coaxially situated within and projecting from the coil; a portion of the inlet flow path passes inward through the projection of the pole into a central bore that opens at the end of the projection; the sealing surface is integrally formed in the pole around the opening of the central bore; and the inlet valve member is a flat plate having a periphery with a rim that provide magnetic flux paths transversely through the valve member and notches that form a portion of the inlet flow path when the valve member is open.

BRIEF DESCRIPTION OF THE DRAWING

A representative embodiment will be described in detail with reference to the accompanying drawings, wherein.

DETAILED DESCRIPTION

Figure 1:
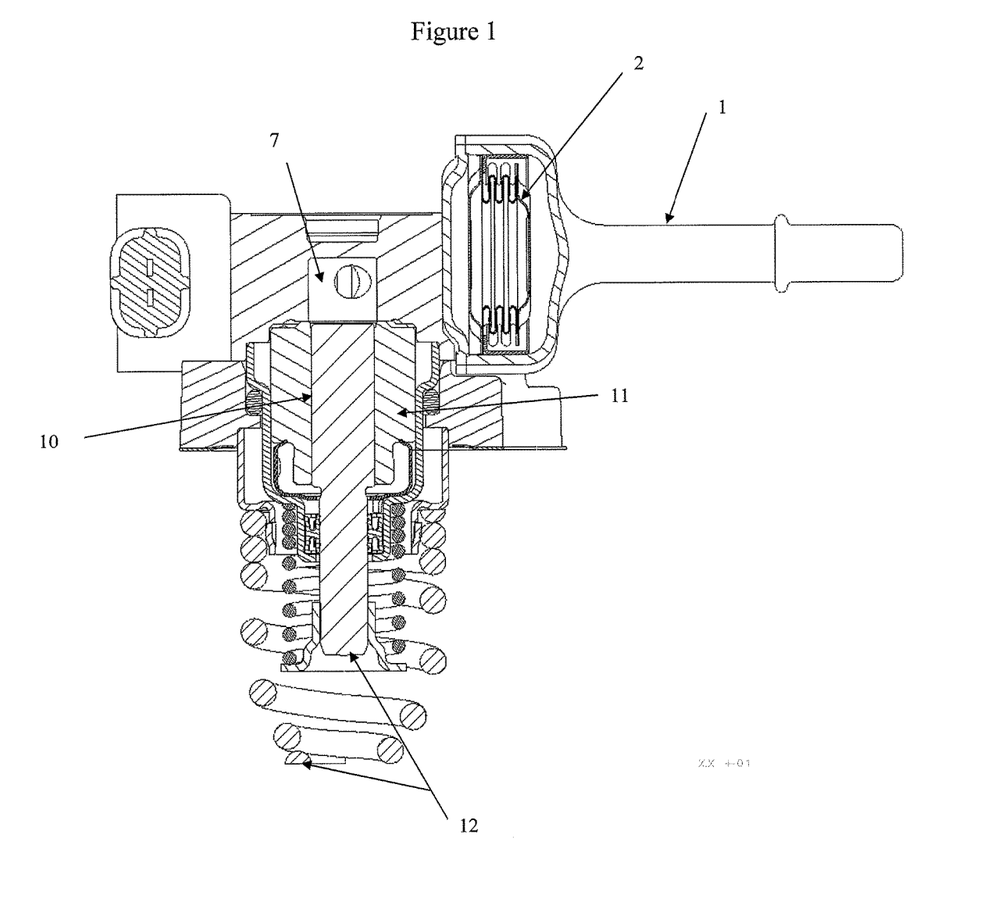
FIG. 1 is a section view of a single piston common rail fuel pump suitable for incorporating the invention.
Figure 2:
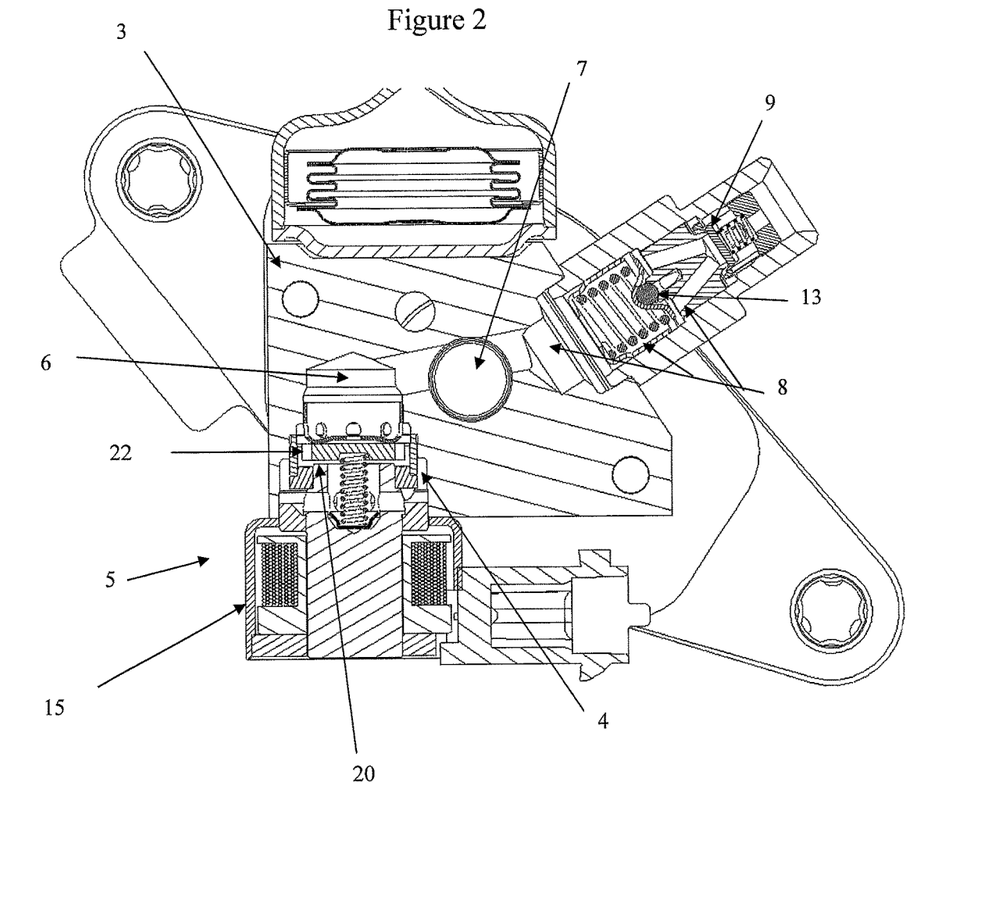
FIG. 2 is a cross-sectional view of the pump of FIG. 1, in a different plane, showing an embodiment of the inlet valve assembly according to the invention.

The basic functional aspects are evident from FIGS. 1 and 2. During the pump charging phase when piston 10 is reciprocally moving away from pumping chamber 7, low pressure fuel enters the pump through inlet fitting 1, passes around the pressure damper 2 and then into the pump housing 3 and a series of low pressure passages. It then enters into inlet annulus 4 assembly for the direct magnetically controlled inlet valve assembly 5, passes around the direct magnetically controlled inlet valve 22 through the passage 6 and into the pumping chamber 7. Upon completion of the charging phase the pumping camshaft acts upon a tappet 12, urging the piston 10, to slide in piston sleeve 11. When the direct magnetically controlled inlet valve assembly 5 is energized with an electrical current to coil assembly 15, a magnetic force is generated urging the inlet valve 22 to close and seal at surface 20, thereby enabling fuel trapped in the pumping chamber 7 to compress and build pressure. When sufficient pressure is built, the outlet valve 9 will open, allowing high pressure discharge flow to pass from the pumping chamber through the high pressure passages 8 past the outlet valve 9 and into the high pressure line, rail, and finally to feed the fuel injectors. The pump is equipped with a relief valve 13 in case there is a system malfunction.

Figure 3:
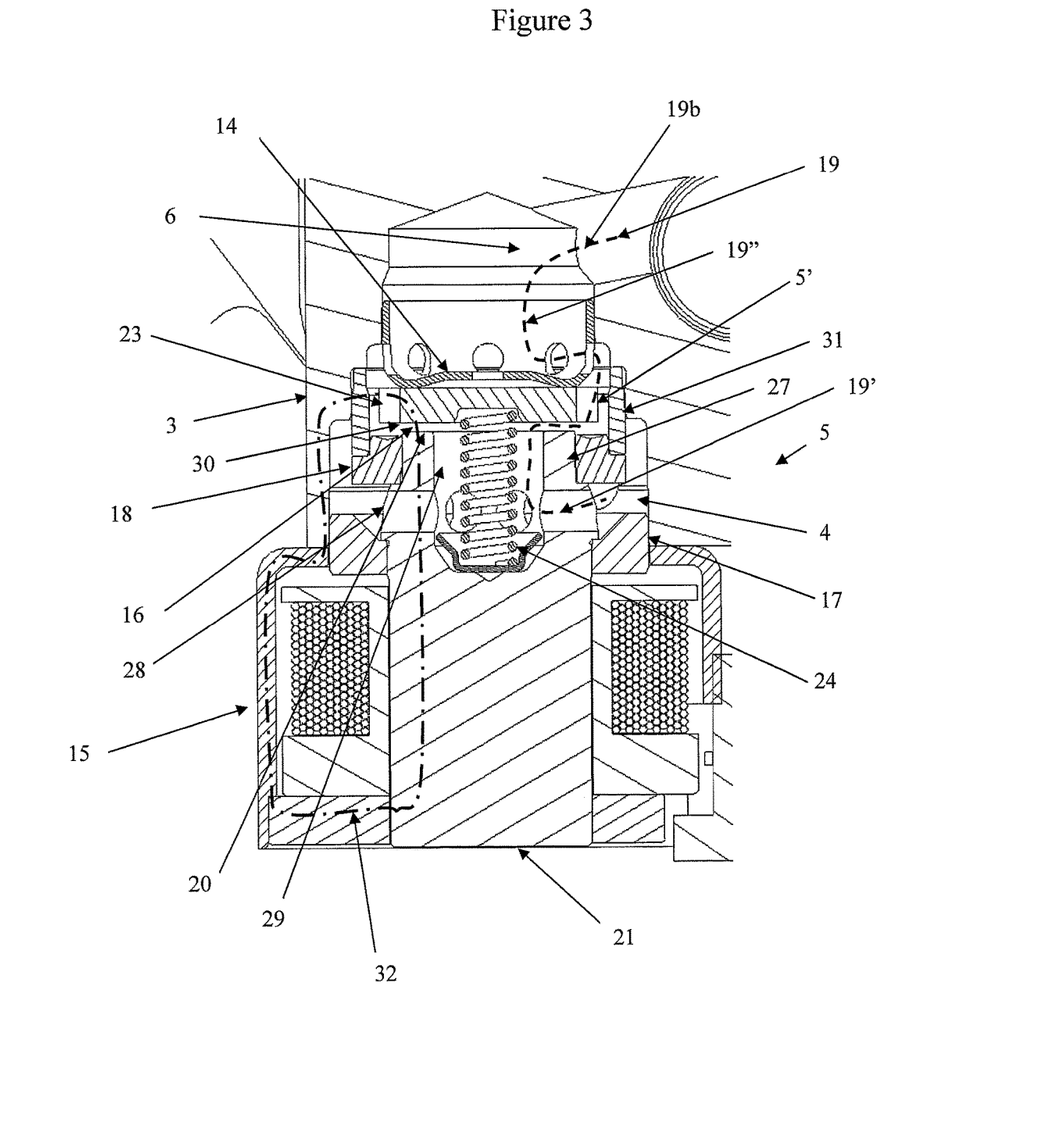
FIG. 3 is an enlarged section view of the inlet valve assembly of FIG. 2.
Figure 4:
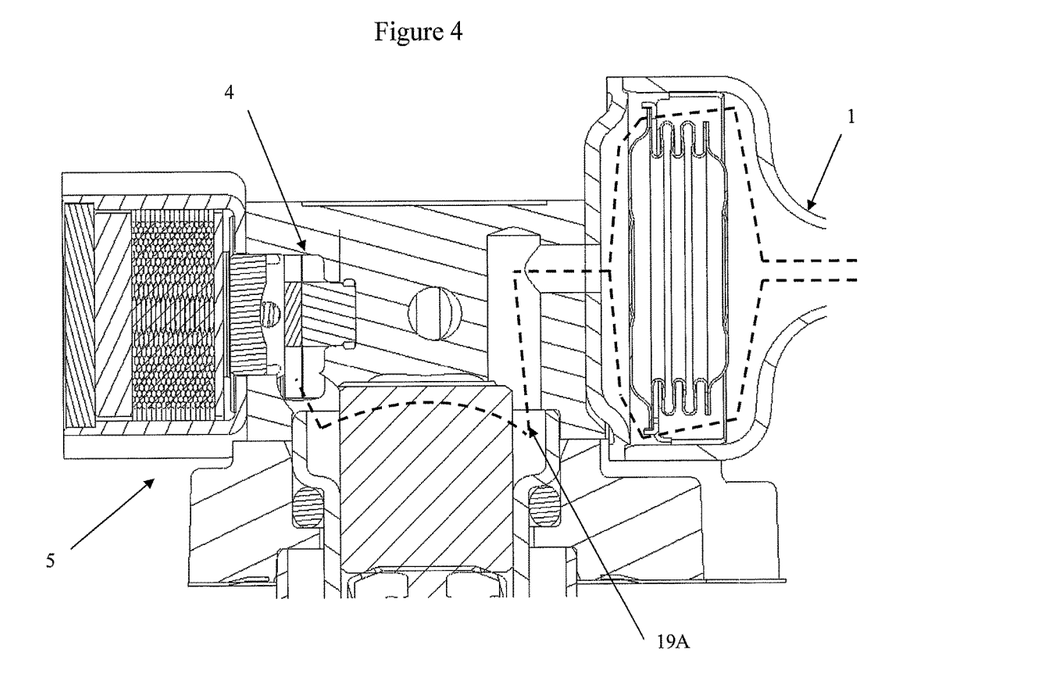
FIG. 4 is a section view through the pump, orthogonal to the view of FIG. 3, showing the inlet fuel flowpath from the inlet fitting to the inlet valve assembly.

FIGS. 3 and 4 provide more detail into the functional aspects of the preferred embodiment. When the direct magnetically controlled inlet valve assembly 5 is de-energized during the charging phase of the pump, valve member 22 opens and fuel is allowed to pass along inlet fluid flow path circuit 19. During the charging phase fuel flows along path portion 19a from inlet fitting 1 to inlet valve inlet annulus 4, through the inlet valve 5, then along path portion 19b through passage 6 toward the pumping chamber. In the disclosed embodiment, the valve assembly 5 functions as both an inlet check valve and a quantity metering valve. During the charging phase, the downward movement of the pumping piston fills the pumping chamber with low pressure fuel from the inlet circuit 19. During the high pressure pumping phase of the piston, highly pressurized fuel cannot be permitted to backflow through passage 19' to the inlet fitting. During this phase the valve member 22 is closed against sealing surface or face 20 of the valve seat portion 27 projecting from the magnetic pole 21, due to both the energization of the coil and the high pressure fuel acting on the top surface of the valve member 22. In order to control the quantity (volume) pumped at high pressure, the energization of the coil is timed to close the valve member 22 corresponding to a certain position on the upward stroke of the cam/piston. Prior to the valve closure, when the piston is moving upward, low pressure is being pushed backwards from the pumping chamber past the inlet valve 22 all the way to the pressure dampers 2 and inlet fitting 1. The dampers absorb much of the pressure spike associated with this backflow. This can be considered a "pumping bypass" phase of the overall piston reciprocation cycle. The overall cycle thus comprises a charging phase, a pumping bypass phase, and a high pressure pumping phase.

In a known manner, the electromagnetic coil assembly 15 is analogous to a solenoid, with a multi-winding coil situated around an axially extending, ferromagnetic cylinder or rod 21 (hereinafter referred to as magnetic pole). One end of the pole projects from the coil. When an electrical current is passed through the coil assy 15, a magnetic field is generated, which flows about the magnetic circuit along magnetic flux lines across radial air gap 23, generating an axial force onto the face of the valve 22 via the varying magnetic air gap 16. When the magnetic force exceeds the force of the inlet valve return spring 24, the valve 22 will close against valve sealing surface 20. The magnetic pole 21 integrally defines sealing surface 20 and is also a part of the magnetic flux path 32. Preferably, an inlet valve stop 14 aids in positioning of the valve 22 for accurate stroke control.

First magnetic break 17 and second magnetic break 18 surround the sealing face 20 to direct the correct magnetic flow path and avoid a magnetic short circuit. Both breaks 17 and 18 should be fabricated from a non-magnetic material and for best performance valve stop 14 should also be fabricated from a non-magnetic material. Breaks 17 and 18 surround the projecting portion of the magnetic pole to prevent magnetic flux from travelling radially to the housing from the pole and thereby short-circuiting the valve member 22. The breaks thereby assure that the flux circuit passes through the coils, the magnet pole, through the sealing surface 20 and air gap 16, through the inlet valve member 22, across radial air gap 23, through conductive ring 31 and pump housing 3, back to the coil 15. In an alternative embodiment, the sealing surface 20' is not unitary with the pole 21; it could be integrated with the second magnetic break 18.

Figure 5:
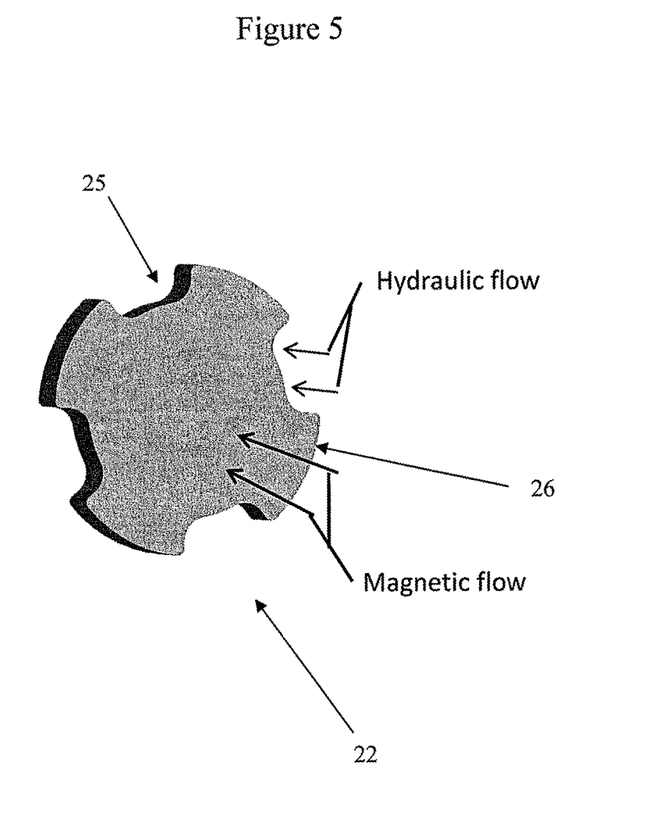
FIG. 5 is an oblique view of the valve member, showing a periphery that includes a rim portion for accommodating transverse flux paths and notches for accommodating hydraulic flow.

FIG. 5 shows additional features which contribute to efficient performance of the disclosed inlet valve assembly. The periphery of the valve member 22 includes a plurality of magnetic flow rim sections or lobes 26 which control the radial air gap 23, and a plurality of hydraulic flow notches 25 which facilitate adequate fuel flow along fluid flow path 19 when the valve opens. The lobes have a rim diameter (max OD) and the notches have a base diameter (min OD). The base diameter is larger than the ID of the valve sealing surface 20, so when the valve 22 is closed during the pumping stroke no flow can pass from pumping chamber across the valve 22 back to the inlet annulus 4'. The min OD should also be at approximately the same diameter as the diameter of the sealing surface 20 to allow sufficient magnetic force across magnetic air gap 16. When valve 22 opens during the charging stroke, fuel flows from the inlet annulus 4' through the notches and through the radial air gap 23. The notches are provided because the air gap 23 must be minimized to maintain sufficient magnetic force, but as a result the annular flow area would otherwise be too small to permit the necessary inlet flow rate to the pumping chamber.

As a stand-alone unit, the disclosed fuel inlet valve assembly 5 shown in FIGS. 3 and 4 can be considered as providing a controlled intermediate flow path within the overall pump inlet flow path 19. A magnetic valve member 22 is situated within the intermediate flow path. The intermediate flow path comprises a valve assembly inflow path 19' fluidly connected to inlet path 19a and starting at inlet annulus 4, and valve assembly outflow path 19" starting downstream of the valve member 22 and ending at flow path 19b into passage 6. The magnetic pole 21 is a rod or cylinder or the like coaxially situated within the magnetic coil 15 and includes one end 27 projecting from the coil 15. A portion 19' of the inflow path passes through transverse holes 28 in the projection of the pole and into a central bore 29, which opens through a sealing face 20 integrally formed at the end of the projection. The inlet valve member 22 is a flat plate that constitutes an armature in relation to the coil 15 and has a sealing face 30 that confronts the sealing surface 20 through a magnetic air gap 16. When lifted off the sealing surface 20, the valve member 22 opens fluid communication from the inflow path 19' (upstream of the sealing surface 20) to the outflow path 19" (downstream of the sealing surface). The valve member 22 includes a periphery with a rim 26 that provides magnetic flux paths transversely through the valve member and notches 25 that form another portion of the valve assembly outflow flow path when the valve member is open.

The invention claimed is:

1. A fuel pump comprising a pump housing, a fuel inlet connection on the housing for delivering feed fuel into an inlet flow path in the housing; a pumping chamber and associated pumping piston in the housing for receiving feed fuel from the inlet flow path through an inlet valve assembly, increasing the fuel pressure, and delivering fuel at said increased pressure to a discharge flow path; an outlet connection on the housing, in fluid communication with the discharge flow path through an outlet valve; wherein the inlet valve assembly includes a valve member directly magnetically coupled to an electromagnetic coil, whereby the coil is selectively energizable to generate a magnetic flux circuit directly through the inlet valve member, thereby selectively applying or removing a magnetic force to said valve member to respectively close and open a sealing face of said valve member against a mating sealing surface in said inlet flow path; and wherein the magnetic flux circuit passes through said sealing surface and said sealing face across a magnetic gap between said sealing surface and said sealing face, with sufficient magnetic force to close the sealing face of the inlet valve member against said sealing surface.

2. The fuel pump of claim 1, wherein a central magnetic pole is coaxially situated within the coil; the sealing surface is situated at one end of the pole; and the sealing surface is integral with said one end of the pole.

3. The fuel pump of claim 2, wherein a portion of said inlet flow path passes through said pole before passing through the magnetic gap between the sealing face of said valve member and said mating sealing surface when the valve member is open.

4. The fuel pump of claim 3, wherein said portion of the inlet flow path passes radially inward through the pole into a central bore that leads to said sealing surface at said one end of the pole.

5. The fuel pump of claim 1, wherein the inlet valve member is a flat plate through which the flux circuit passes and said flat plate includes a notched periphery that forms a portion of the inlet flow path when the valve member is open.

6. The fuel pump of claim 5, wherein the inlet valve member periphery includes rim portions that provide magnetic flux paths of the magnetic circuit, transversely through the valve member.

7. The fuel pump of claim 1, wherein the magnetic flux circuit extends through the pump housing.

8. The fuel pump of claim 1, including an inlet valve stop constituted from non-magnetic material and situated adjacent the inlet valve member for positioning the valve member.

9. The fuel pump of claim 1, wherein the inlet valve assembly includes a central magnetic pole coaxially situated within and including one end projecting from the coil; a portion of the inlet flow path passes through the projection of the pole into a central bore that opens at said one end of the projection; said sealing surface is integrally formed in the pole around said opening of the central bore; and the inlet valve member is a flat plate having a sealing face confronting the sealing surface and a periphery with a rim that provide magnetic flux paths transversely through the valve member and notches that form another portion of the inlet flow path when the valve member is open.

10. The fuel pump of claim 9, wherein the coil is energized to close the inlet valve member by pulling the sealing face onto the sealing surface; thereby overcoming a mechanical force of a return spring situated in said central bore for biasing the valve member open in a direction away from the sealing surface.

11. The fuel pump of claim 1, wherein the valve member constitutes an armature in relation to the coil.

12. An inlet valve assembly for a fuel pump, comprising:
a valve assembly inflow path and valve assembly outflow path;
a magnetic valve member having a sealing face confronting a spaced apart sealing surface situated in an intermediate position fluidly linking the inflow path and the outflow path;
a magnetic pole magnetically coupled to said sealing surface, with the sealing surface confronting the sealing face of the valve member across a magnetic gap in said fluidly linking flow path; and
a selectively energizable electromagnetic coil around said pole, for closing the sealing face of the valve member against said sealing surface by generating a magnetic flux circuit directly magnetically coupling the pole and the sealing face of the valve member through said magnetic gap with sufficient magnetic force to close the sealing face of the inlet valve member against said sealing surface;
whereby the valve member opens and closes fluid communication between the inflow path and the outflow path in response to a respective de-energized and energized state of the coil.

13. The fuel inlet valve assembly of claim 12, wherein the valve member constitutes an armature in relation to the coil.

14. The fuel inlet valve assembly of claim 12, wherein the magnetic pole is a cylinder coaxially situated within and includes one end projecting from the electromagnetic coil; a portion of the valve assembly inflow path passes through the projection of the pole into a central bore that opens at said one end of the projection; said sealing surface is integrally formed in the pole around said opening of the central bore; and the inlet valve member is a flat plate having said sealing face confronting the sealing surface through said magnetic gap and a periphery with a rim that provide magnetic flux paths of said magnetic circuit transversely through the valve member and notches that form a portion of the valve assembly outflow path when the coil is de-energized and the valve member is open.

15. The fuel inlet valve assembly of claim 14, wherein the coil is energized to close the inlet valve member by pulling the sealing face onto the sealing surface; and a return spring is situated in said central bore for biasing the valve member open in a direction away from the sealing surface when the coil is de-energized.

16. The fuel inlet valve assembly of claim 12, wherein, the valve member is a plate; a conducting ring is circumferentially spaced around the valve member, thereby creating a radial magnetic air gap between the conducting ring and the valve member; and a magnetic break is situated between the pole and the conducting ring, for isolating the magnetic circuit from the sealing surface and guiding the magnetic circuit to the conducting ring, through the radial air gap, to the valve member.

17. The fuel inlet valve assembly of claim 16, wherein the valve assembly is supported in a conductive pump housing; the inflow path, valve member, and outflow path are in the pump housing; said pole has one end with integrated sealing surface that together project from the coil into said housing; and the magnetic break is situated between said one end of the pole and the housing, thereby guiding the magnetic circuit to the conducting ring through the housing.

18. A fuel pump comprising: a pump housing; a fuel inlet connection on the housing for delivering feed fuel into an inlet flow path in the housing; a pumping chamber and associated pumping piston in the housing for receiving feed fuel from the inlet flow path through an inlet valve assembly, increasing the fuel pressure, and delivering fuel at said increased pressure to a discharge flow path; an outlet connection on the housing, in fluid communication with the discharge flow path through an outlet valve; an inlet valve assembly including a valve member directly magnetically coupled to an electromagnetic coil, whereby the coil is selectively energizable to generate a magnetic flux circuit directly through the inlet valve member, thereby selectively applying or removing a magnetic force to said valve member to respectively close and open a sealing face of said valve member against a mating sealing surface in said inlet flow path; and wherein the magnetic flux circuit passes through said sealing surface and said sealing face; and the inlet valve assembly includes a central magnetic pole coaxially situated within and including one end projecting from the coil, a portion of the inlet flow path passes radially through the pole and through the projection of the pole into a central bore, in the projection of the pole, that opens at said one end of the projection.

19. An inlet valve assembly for a fuel pump, comprising: a valve assembly inflow path and valve assembly outflow path; a magnetic valve member having a sealing face confronting a spaced apart sealing surface situated in an intermediate position fluidly linking the inflow path and the outflow path; a magnetic pole confronting the sealing face of the valve member; and a selectively energizable coil for closing the face of the valve member against said sealing surface by generating a magnetic flux circuit directly magnetically coupling the magnetic pole and the face of the valve member; whereby the valve member opens and closes fluid communication between the inflow path and the outflow path in response to the a respective de-energized and energized state of the coil and wherein the magnetic pole is a cylinder coaxially situated within and includes one end projecting from an electromagnetic coil, and a portion of the valve assembly inflow path passes radially through the magnetic pole and through the projection of the magnetic pole into a central bore, in the projection of the magnetic pole, which that opens at said one end of the projection.

* * * * *